United States Patent
Kwon et al.

(10) Patent No.: US 12,537,044 B2
(45) Date of Patent: Jan. 27, 2026

(54) SEMICONDUCTOR DEVICE AND MEMORY DEVICE INCLUDING COMPLEMENTARY DELAY CIRCUITS FOR MAXIMIZING OPERATION EFFICIENCY WHILE MINIMIZING AREA OCCUPIED BY DELAY CIRCUITS

(71) Applicant: SK hynix Inc., Gyeonggi-do (KR)

(72) Inventors: Jae Kwon, Gyeonggi-do (KR); Chae Hyoun Park, Gyeonggi-do (KR); Yun Jin Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 108 days.

(21) Appl. No.: 18/581,398

(22) Filed: Feb. 20, 2024

(65) Prior Publication Data
US 2025/0124968 A1 Apr. 17, 2025

(30) Foreign Application Priority Data
Oct. 11, 2023 (KR) .................. 10-2023-0135048

(51) Int. Cl.
| | |
|---|---|
| *G11C 7/12* | (2006.01) |
| *G11C 11/4076* | (2006.01) |
| *G11C 11/408* | (2006.01) |
| *G11C 11/4091* | (2006.01) |

(52) U.S. Cl.
CPC ...... *G11C 11/4076* (2013.01); *G11C 11/4085* (2013.01); *G11C 11/4091* (2013.01)

(58) Field of Classification Search
CPC .... H03K 5/133; H03K 5/134; G11C 11/4076; G11C 11/4085; G11C 11/4091; G11C 7/222; G11C 7/065
See application file for complete search history.

(56) References Cited

U.S. PATENT DOCUMENTS

| | | | |
|---|---|---|---|
| 9,627,033 B2 * | 4/2017 | Kim | .................... G11C 11/4093 |
| 11,335,398 B2 | 5/2022 | Na | |
| 11,652,474 B2 * | 5/2023 | Shin | ...................... H03K 5/135 327/291 |

(Continued)

FOREIGN PATENT DOCUMENTS

| | | |
|---|---|---|
| KR | 10-2007-0044188 A | 4/2007 |
| KR | 10-2010-0107346 A | 10/2010 |
| KR | 101168388 B1 * | 7/2012 |

OTHER PUBLICATIONS

KR101168388B1 english translation attached (Year: 2012).*
Translation.*

*Primary Examiner* — Mushfique Siddique
(74) *Attorney, Agent, or Firm* — IP & T GROUP LLP

(57) ABSTRACT

A semiconductor device includes a first delay circuit having a first delay amount that decreases according to a common bias, and configured to generate a first delay control signal based on the first delay amount; a second delay circuit having a second delay amount that increases according to the common bias, and configured to generate a second delay control signal based on the second delay amount; a signal generation circuit configured to generate a plurality of internal control signals in response to at least one of the first delay control signal and the second delay control signal; and an internal operation circuit configured to complementarily perform a first operation and a second operation within a target time in response to the internal control signals.

20 Claims, 15 Drawing Sheets

(56) References Cited

U.S. PATENT DOCUMENTS

| | | | |
|---|---|---|---|
| 2004/0202039 A1* | 10/2004 | Takayanagi | G11C 29/023 365/233.1 |
| 2006/0221727 A1* | 10/2006 | Yamashita | G11C 29/028 365/194 |
| 2007/0121394 A1* | 5/2007 | Noda | G11C 7/1066 365/194 |
| 2008/0002501 A1* | 1/2008 | Lee | G11C 7/08 365/189.11 |
| 2019/0058576 A1* | 2/2019 | Lim | H04L 7/0334 |
| 2021/0050050 A1* | 2/2021 | Na | G11C 11/4074 |
| 2023/0036684 A1 | 2/2023 | Jung et al. | |

* cited by examiner

SEMICONDUCTOR DEVICE AND MEMORY DEVICE INCLUDING COMPLEMENTARY DELAY CIRCUITS FOR MAXIMIZING OPERATION EFFICIENCY WHILE MINIMIZING AREA OCCUPIED BY DELAY CIRCUITS

CROSS-REFERENCE TO RELATED APPLICATION

The present application claims priority of Korean Patent Application No. 10-2023-0135048, filed on Oct. 11, 2023, which is herein incorporated by reference in its entirety.

BACKGROUND

1. Field

Various embodiments of the present disclosure relate to semiconductor design technology, and specifically to, a semiconductor device and a memory device including complementary delay circuits.

2. Description of the Related Art

In general, a semiconductor device such as a memory device needs to perform predetermined operations sequentially or in parallel within a time set in the specification. To this end, delay circuits for controlling the timing of each operation are disposed inside the semiconductor device. A myriad of delay circuits configured as described above are designed and used inside the semiconductor device, thereby reducing the area efficiency of the semiconductor device.

SUMMARY

Various embodiments of the present disclosure are directed to a semiconductor device and a memory device capable of performing internal operations to be performed in a target time in conjunction with each other, using delay circuits that complement each other based on a common bias.

According to an embodiment of the present disclosure, a semiconductor device includes a first delay circuit having a first delay amount that decreases according to a common bias, and configured to generate a first delay control signal based on the first delay amount; a second delay circuit having a second delay amount that increases according to the common bias, and configured to generate a second delay control signal based on the second delay amount; a signal generation circuit configured to generate a plurality of internal control signals in response to at least one of the first delay control signal and the second delay control signal; and an internal operation circuit configured to complementarily perform a first operation and a second operation within a target time in response to the internal control signals.

According to an embodiment of the present disclosure, a memory device includes a memory cell array; a control logic configured to generate a first delay control signal based on a first delay amount that decreases according to a common bias, a second delay control signal based on a second delay amount that increases according to the common bias, and a plurality of internal control signals corresponding to a command according to the first delay control signal and the second delay control signal; a row control circuit coupled to the memory cell array through a plurality of word lines, and configured to drive the word lines in response to the internal control signals; and a sense amplifying circuit coupled to the memory cell array through a plurality of bit lines, and configured to sense and amplify data of the bit lines in response to the internal control signals.

According to embodiments of the present disclosure, the semiconductor device and the memory device may maximize the operation efficiency while minimizing the area occupied by the delay circuits.

DETAILED DESCRIPTION

Figure 1:
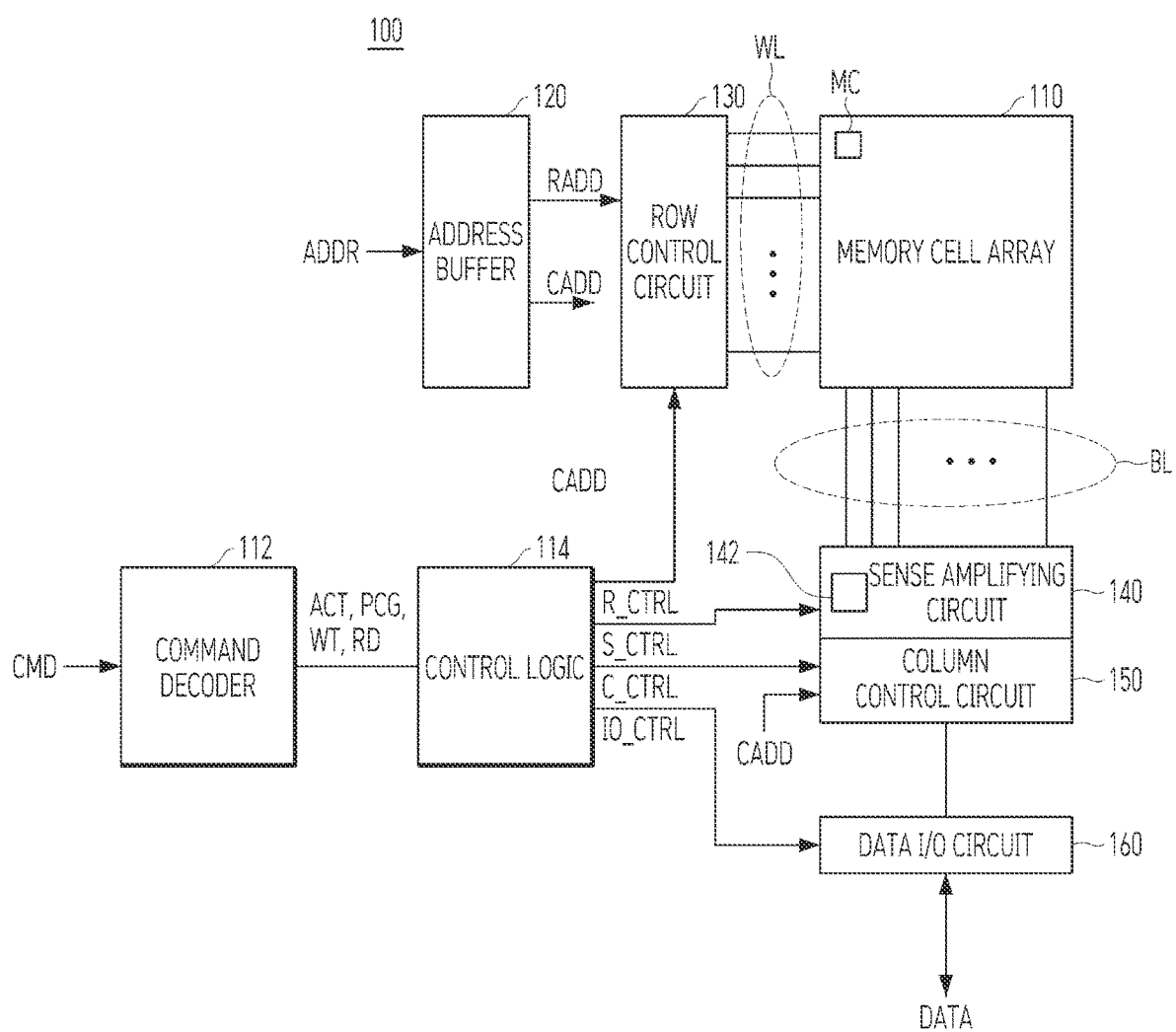
FIG. 1 is a block diagram illustrating a memory device in accordance with an embodiment of the present disclosure.

Various embodiments of the present disclosure are described below with reference to the accompanying drawings. The embodiments may, however, be embodied in different forms and thus should not be construed as limited to the embodiments set forth herein. Throughout this disclosure, like reference numerals refer to like parts throughout the various figures and embodiments of the present invention. It is noted that reference to "an embodiment," "another embodiment" or the like does not necessarily mean only one embodiment, and different references to any such phrase are not necessarily to the same embodiment(s). The term "embodiments" when used herein does not necessarily refer to all embodiments.

It will be understood that, although the terms "first", "second", "third", and so on may be used herein to identify various elements, these elements are not limited by these terms. These terms are used to distinguish one element from another element that otherwise have the same or similar names. Thus, a first element in one instance could also be termed a second or third element in another instance without indicating any change in the element itself.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present. Communication between two elements, whether directly or indirectly connected/coupled, may be wired or wireless, unless stated or the context indicates otherwise.

As used herein, singular forms may include the plural forms as well and vice versa, unless the context clearly indicates otherwise.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

FIG. 1 is a block diagram illustrating a memory device 100 in accordance with an embodiment of the present disclosure.

Referring to FIG. 1, the memory device 100 may be a storage apparatus that is based on a semiconductor device. For example, the memory device 100 may be a volatile memory such as a dynamic random access memory (DRAM), a synchronous DRAM (SDRAM), a double data rate SDRAM (DDR SDRAM), a low-power DDR SDRAM (LPDDR SDRAM), a graphic DDR SDRAM (GDDR SDRAM), a DDR2 SDRAM, a DDR3 SDRAM, a DDR4 SDRAM, a thyristor RAM (TRAM), or the like, or a nonvolatile memory such as a phase change random access memory (PRAM), a magnetic random access memory (MRAM), a resistive random access memory (RRAM), or the like.

The memory device 100 may input/output data DATA from/to an external device, for example, a memory controller (not shown), in response to a command CMD and an address ADDR received from the memory controller. The memory device 100 may include a memory cell array 110, a command decoder 112, a control logic 114, an address buffer 120, a row control circuit 130, a sense amplifying circuit 140, a column control circuit 150 and a data input/output (I/O) circuit 160.

The memory cell array 110 may include a plurality of memory cells MC which are arranged in a plurality of word lines WL and a plurality of bit lines BL in the form of an array. Depending on an embodiment, the memory cell array 110 may include a plurality of banks (not shown). The number of banks or the number of memory cells MC may be determined according to the capacity of the memory device 100.

The command decoder 112 may generate various internal commands needed for an operation of the memory device 100 by decoding the command CMD. For example, the command decoder 112 may generate an active command ACT, a precharge command PCG, a read command RD, and a write command WT by decoding the command CMD transmitted from the memory controller.

The control logic 114 may generate internal control signals for controlling overall operations of the memory device 100 based on the active command ACT, the precharge command PCG, the read command RD, and the write command WT provided from the command decoder 112. For example, the control logic 114 may generate a row control signal R_CTRL for controlling an operation of the row control circuit 130, a sensing control signal S_CTRL for controlling an operation of the sense amplifying circuit 140, and a column control signal C_CTRL for controlling an operation of the column control circuit 150, and an input/output control signal IO_CTRL for controlling an operation of the data input/output circuit 160.

The address buffer 120 may buffer the address ADDR received from the memory controller. The address ADDR may include a row address RADD for designating a word line of the memory cell array 110, and a column address CADD for designating a bit line of the memory cell array 110. The address buffer 120 may transmit the row address RADD to the row control circuit 130, and transmit the column address CADD to the column control circuit 150.

The row control circuit 130 may be coupled to the memory cell array 110 through the plurality of word lines WL. The row control circuit 130 may drive a word line among the plurality of word lines WL, corresponding to the row address RADD, in response to the row control signal R_CTRL. For example, the row control circuit 130 may activate a word line selected by the row address RADD in response to the row control signal R_CTRL corresponding to the active command ACT, and precharge the activated word line in response to the row control signal R_CTRL corresponding to the precharge command PCG.

The sense amplifying circuit 140 may be coupled to the memory cell array 110 through the plurality of bit lines BL. The sense amplifying circuit 140 may be distributed and disposed inside the memory cell array 110. The sense amplifying circuit 140 may include a plurality of bit line sense amplifiers 142 corresponding to the plurality of bit lines BL, respectively. The bit line sense amplifiers 142 may be coupled between a pull-up voltage line (see RTO in FIG. 8B) and a pull-down voltage line (see SB in FIG. 8B), and sense and amplify data of the bit lines BL in response to the sensing control signal S_CTRL. For example, the bit line sense amplifiers 142 are each connected to a pair of bit lines to sense and amplify a voltage difference between the pair of bit lines.

The column control circuit 150 may select predetermined bit lines BL among the plurality of bit lines BL, corresponding to the column address CADD, in response to the column control signal C_CTRL. The column control circuit 150 may read data from the memory cell array 110 through the bit line sense amplifiers 142 coupled to the selected bit lines BL in response to the column control signal C_CTRL corresponding to the read command RD. In addition, the column control circuit 150 may write data DATA provided from the memory controller to the memory cell array 110 through the bit line sense amplifiers 142 coupled to the selected bit lines BL in response to the column control signal C_CTRL corresponding to the write command WT.

The data input/output circuit 160 may be coupled to the column control circuit 150, to output data DATA provided from the column control circuit 150 to the memory controller, or transmit data DATA provided from the memory controller to the column control circuit 150.

In the above configuration, the sense amplifying circuit 140 may sequentially perform precharge operation, an offset cancellation operation, a charge sharing operation, and an amplification operation in response to the sensing control signal S_CTRL.

Figure 2:
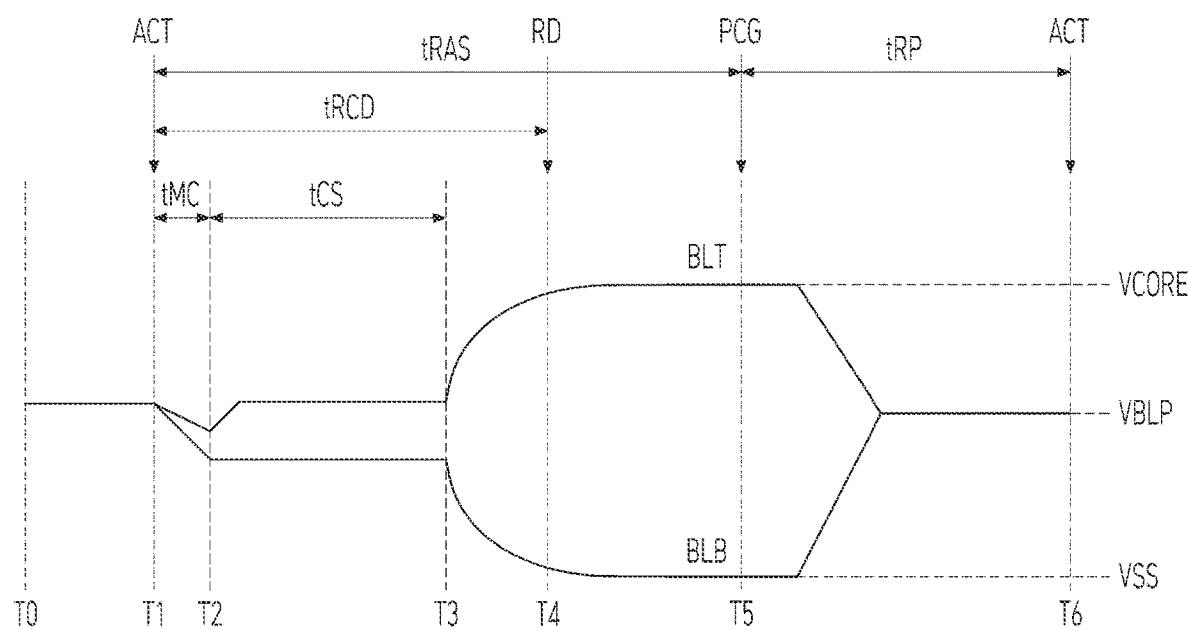
FIG. 2 is a waveform diagram for describing an operation of a sense amplifying circuit of FIG. 1.

FIG. 2 is a waveform diagram for describing an operation of the sense amplifying circuit 140 of FIG. 1. In FIG. 2, a read operation of a bit line sense amplifier 142 is illustrated.

Referring to FIG. 2, during a section from T0 to T1 before the active command ACT is input, the bit line sense amplifier 142 may perform a precharge operation of driving a pair of bit lines BLT and BLB to a precharge voltage VBLP. The precharge voltage VBLP may be set to an intermediate level between a core voltage VCORE and a ground voltage VSS.

When the active command ACT is input at T1, during a section from T1 to T2 (hereinafter, referred to as an "offset cancellation period tMC"), the bit line sense amplifier 142 may perform an offset cancellation operation. During the offset cancellation period tMC, a voltage level of a first bit line BLT may be higher than that of a second bit line BLB by an offset voltage.

During a section from T2 to T3 (hereinafter, referred to as a "charge sharing period tCS"), the bit line sense amplifier 142 may perform a charge sharing operation. Since the word line WL is activated, charge sharing between the first bit line BLT and the memory cell MC may occur. For example, when a high data is stored in the memory cell MC (i.e., when a voltage level of a cell capacitor of the memory cell MC is greater than or equal to a reference value), the voltage level of the first bit line BLT may increase by a voltage variation amount ΔV during the charge sharing period tCS. Although not shown in FIG. 2, when a low data is stored in the memory cell MC, the voltage level of the first bit line BLT may decrease by the voltage variation amount ΔV.

Thereafter, during a section from T3 to T4 before the read command RD is input, the bit line sense amplifier 142 may perform a pre-sensing operation to secure a sensing margin of a main sensing operation subsequently performed. Depending on an embodiment, the pre-sensing operation may be included in the charge sharing period tCS. When the read command RD is input at T4, during a section from T4 to T5, the bit line sense amplifier 142 may sense and amplify a voltage difference between the first bit line BLT and the second bit line BLB by performing the main sensing operation. The main sensing operation may be defined as an amplification operation.

When the precharge command PCG is input at T5, the bit line sense amplifier 142 may perform a precharge operation of driving the first bit line BLT and the second bit line BLB to the precharge voltage VBLP.

When the active command ACT is input at T6, the above operations i.e., the precharge operation, the offset cancellation operation, the charge sharing operation, and the amplification operation, may be performed again.

In order to stably perform the operation of the memory device, various timing parameters are defined in the specification. For example, a time from an input of the active command ACT to an input of the precharge command PCG, i.e., the section from T1 to T5 of FIG. 2, is defined as a row access time tRAS, and a time from the input of the precharge command PCG to the input of the active command ACT, i.e., the section from T5 to T6 of FIG. 2, is defined as a row precharge time tRP. Also, a time from the input of a row active command (i.e., the active command ACT) to the input of a column active command (e.g., the read command RD), i.e., the section from T1 to T4 of FIG. 2, is defined as a RAS-to-CAS delay time tRCD. As illustrated in FIG. 2, the offset cancellation operation and the charge sharing operation may be sequentially performed within the RAS-to-CAS delay time tRCD.

Hereinafter, in an embodiment of the present disclosure, a method of controlling the offset cancellation operation and the charge sharing operation sequentially performed within the RAS-to-CAS delay time tRCD using complementary delay circuits will be described.

Figure 3:
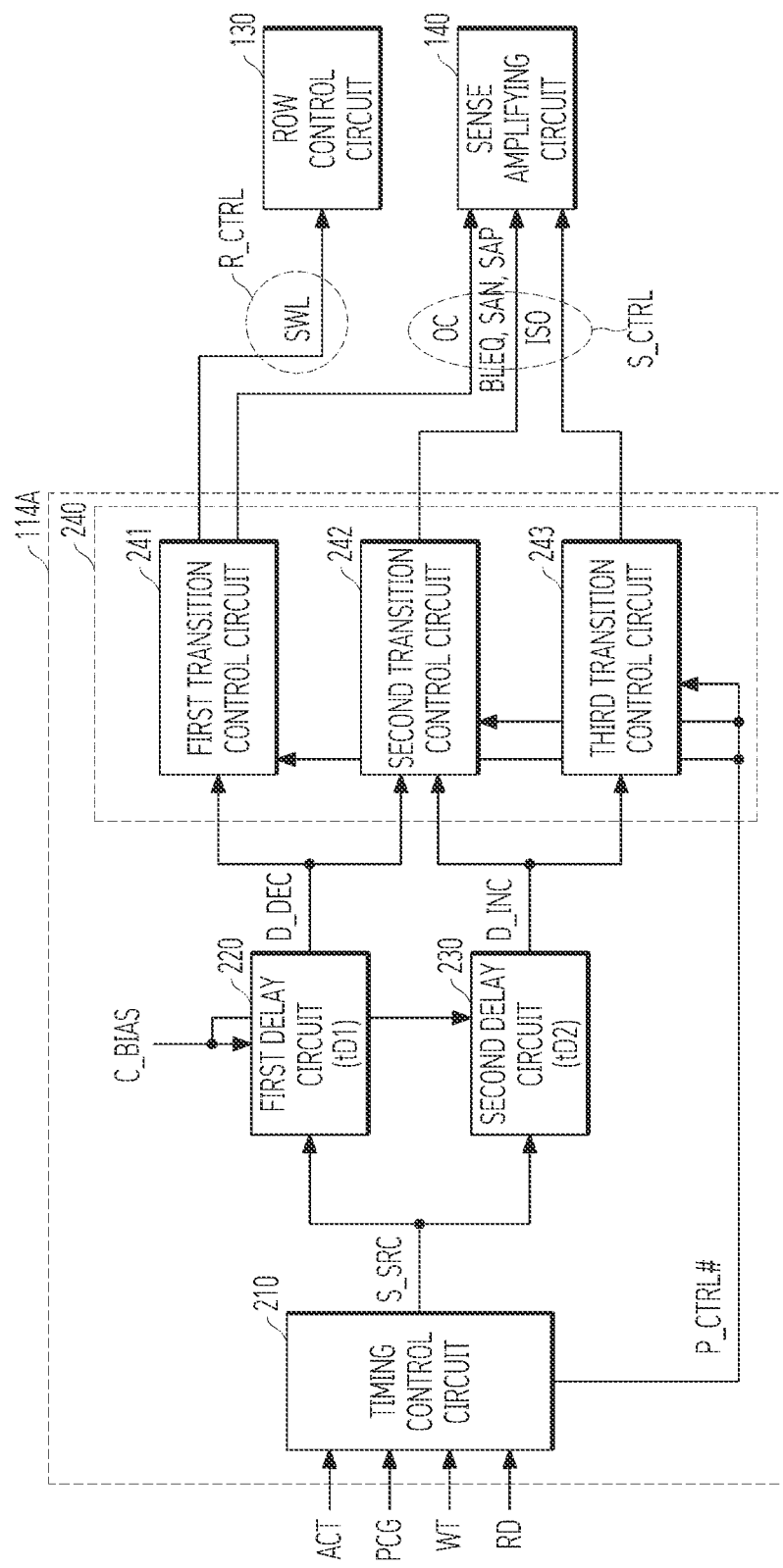
FIG. 3 is a detailed block diagram illustrating a control logic of FIG. 1 in accordance with an embodiment of the present disclosure.

FIG. 3 is a detailed block diagram illustrating a control logic 114A in accordance with an embodiment of the present disclosure. The control logic 114A of FIG. 3 may correspond to the control logic 114 shown in FIG. 1.

Referring to FIG. 3, the control logic 114A may include a timing control circuit 210, a first delay circuit 220, a second delay circuit 230, and a signal generation circuit 240.

The timing control circuit 210 may generate a source signal S_SRC and a plurality of timing control signals P_CTRL # based on the internal commands, e.g., the active command ACT, the precharge command PCG, the read command RD, and the write command WT. The source signal S_SRC may be a signal having a predetermined period of a high level. For example, the source signal S_SRC may have different levels during the offset cancellation period tMC and the charge sharing period tCS to distinguish the offset cancellation period tMC and the charge sharing period tCS. The plurality of timing control signals P_CTRL # may be signals that transition at a promised timing to perform internal operations, such as the precharge operation, the offset cancellation operation, the charge sharing operation, and the amplification operation described in FIG. 2. In FIG. 3, the reference symbol "#" may denote the plural. In an embodiment of the present disclosure, the plurality of timing control signals P_CTRL # may include a preliminary word line driving signal, a preliminary bit line precharge signal, a preliminary pull-up driving signal, a preliminary pull-down driving signal, a preliminary offset cancellation signal, and a preliminary isolation signal to be described later.

The first delay circuit 220 may have a first delay amount tD1 that decreases according to a common bias C_BIAS. The first delay amount tD1 may decrease as a magnitude of the common bias C_BIAS increases. The first delay circuit 220 may generate a first delay control signal D_DEC based on the first delay amount tD1. For example, the first delay circuit 220 may generate the first delay control signal D_DEC by adjusting a pulse width of the source signal S_SRC according to the first delay amount tD1. As a result, the first delay control signal D_DEC may have a pulse width that decreases as the magnitude of the common bias C_BIAS increases compared to the source signal S_SRC.

The second delay circuit 230 may have a second delay amount tD2 which increases according to the common bias C_BIAS. The second delay amount tD2 may increase as the magnitude of the common bias C_BIAS increases. The second delay circuit 230 may generate a second delay control signal D_INC based on the second delay amount tD2. For example, the second delay circuit 230 may generate the second delay control signal D_INC by adjusting the pulse width of the source signal S_SRC according to the second delay amount tD2. As a result, the second delay control signal D_INC may have a pulse width which increases as the magnitude of the common bias C_BIAS increases compared to the source signal S_SRC.

The signal generation circuit 240 may generate a plurality of internal control signals according to at least one of the first delay control signal D_DEC and the second delay control signal D_INC. The signal generation circuit 240 may generate the plurality of internal control signals corresponding to the plurality of timing control signals P_CTRL # according to the first delay control signal D_DEC and the second delay control signal D_INC. The signal generation circuit 240 may generate the plurality of internal control signals by adjusting transition timings of the plurality of timing control signals P_CTRL # according to the first delay control signal D_DEC and the second delay control signal D_INC. In an embodiment of the present disclosure, the internal control signals may include the row control signal R_CTRL and the sensing control signal S_CTRL. The row control signal R_CTRL includes a word line driving signal SWL for driving a word line selected from among the plurality of word lines, and the sensing control signal S_CTRL includes a bit line precharge signal BLEQ, a pull-up driving signal SAP, a pull-down driving signal SAN, an offset cancellation signal OC, and an isolation signal ISO.

In detail, the signal generation circuit 240 may include first to third transition control circuits 241 to 243.

The first transition control circuit 241 may receive the preliminary word line driving signal and the preliminary offset cancellation signal among the timing control signals P_CTRL # and generate the word line driving signal SWL and the offset cancellation signal OC by adjusting one of falling and rising edges of the received signals according to the first delay control signal D_DEC.

The second transition control circuit 242 may receive the preliminary bit line precharge signal, the preliminary pull-up driving signal, and the preliminary pull-down driving signal among the timing control signals P_CTRL #, and generate the bit line precharge signal BLEQ, the pull-up driving signal SAP, and the pull-down driving signal SAN by adjusting one of falling and rising edges of the received signals according to the first delay control signal D_DEC while adjusting the other one of the falling and rising edges of the received signals according to the second delay control signal D_INC.

The third transition control circuit 243 may receive the preliminary isolation signal among the timing control signals P_CTRL #, and generate the isolation signal ISO by adjusting one of falling and rising edges of the received signal according to the second delay control signal D_INC.

The word line driving signal SWL may be provided to the row control circuit 130 as the row control signal R_CTRL, and the bit line precharge signal BLEQ, the pull-up driving signal SAP, the pull-down driving signal SAN, the offset cancellation signal OC and the isolation signal ISO may be provided to the sense amplifying circuit 140 as the sensing control signal S_CTRL.

Figure 4A:
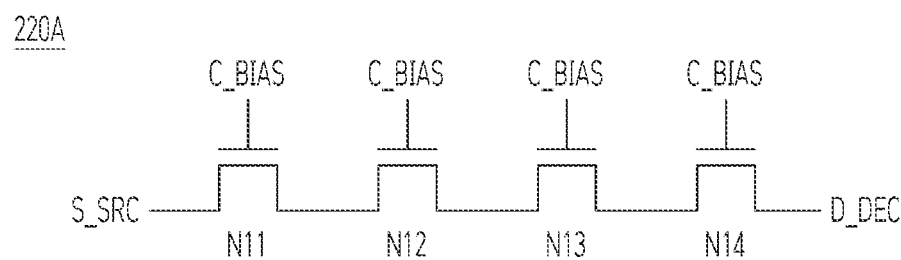
FIGS. 4A and 4B are detailed circuit diagrams illustrating a first delay circuit and a second delay circuit of FIG. 3 according to a first embodiment of the present disclosure.
Figure 4B:
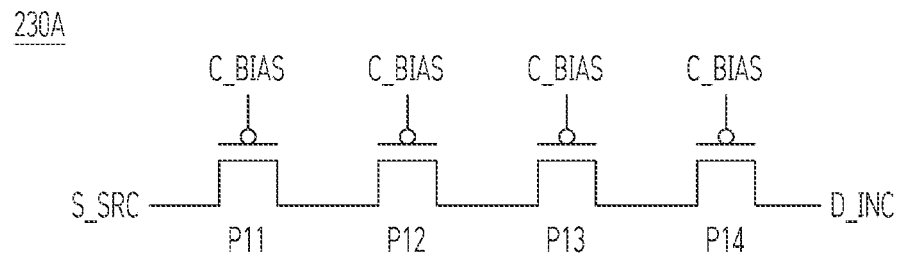

FIGS. 4A and 4B are detailed circuit diagrams illustrating a first delay circuit 220A and a second delay circuit 230A according to a first embodiment of the present disclosure. The first delay circuit 220A and the second delay circuit 230A of FIGS. 4A and 4B may correspond to the first delay circuit 220 and the second delay circuit 230 shown in FIG. 3, respectively.

Referring to FIG. 4A, the first delay circuit 220A may include a plurality of NMOS transistors N11 to N14 coupled in series between an input terminal receiving the source signal S_SRC and an output terminal outputting the first delay control signal D_DEC. The plurality of NMOS transistors N11 to N14 each may receive the common bias C_BIAS through their gates. The NMOS transistor N11 at a first stage may receive the source signal S_SRC through a drain thereof, and the NMOS transistor N14 at a last stage may output the first delay control signal D_DEC through a source thereof. For reference, an NMOS transistor has a characteristic that a channel resistance decreases as a gate voltage increases, and the channel resistance increases as the gate voltage decreases. As a result, the first delay circuit 220A may have the first delay amount tD1 whose delay amount decreases since the channel resistance decreases as the magnitude of the common bias C_BIAS increases.

Referring to FIG. 4B, the second delay circuit 230A may include a plurality of PMOS transistors P11 to P14 coupled in series between an input terminal receiving the source signal S_SRC and an output terminal outputting the second delay control signal D_INC. The plurality of PMOS transistors P11 to P14 each may receive the common bias C_BIAS through their gates, respectively. The PMOS transistor P11 at a first stage may receive the source signal S_SRC through a source thereof, and the PMOS transistor P14 at a last stage may output the second delay control signal D_INC through a drain thereof. For reference, a PMOS transistor has a characteristic that a channel resistance increases as a gate voltage increases, and the channel resistance decreases as the gate voltage decreases. As a result, the second delay circuit 230A may have the second delay amount tD2 whose delay amount increases since the channel resistance increases as the magnitude of the common bias C_BIAS increases.

With the above configuration, the first delay circuit 220A and the second delay circuit 230A may have delay amounts that complementarily decrease and increase according to the common bias C_BIAS. Though FIGS. 4A and 4B illustrate four NMOS transistors N11 to N14 and four PMOS transistors P11 to P14, the present invention is not limited thereto, and a predetermined number of transistors may be connected in series, respectively. In this case, the number of the NMOS transistors N11 to N14 and the number of the PMOS transistors P11 to P14 may be the same or different from each other.

Figure 5:
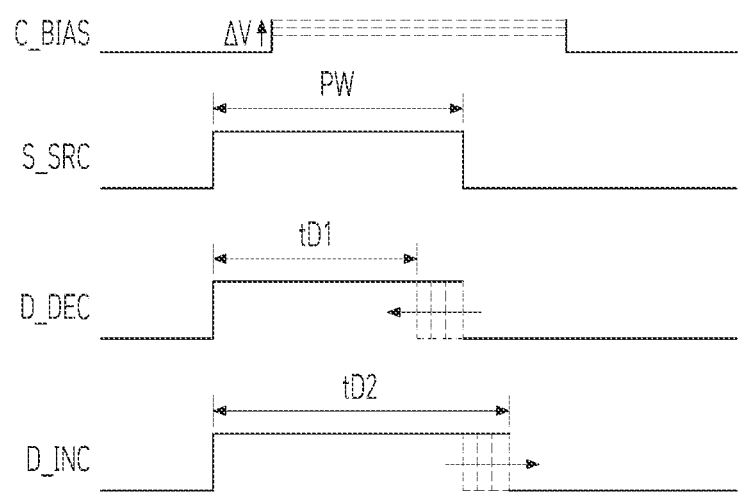
FIG. 5 is a waveform diagram for describing an operation of the first delay circuit and the second delay circuit of FIG. 4.

FIG. 5 is a waveform diagram for describing an operation of the first delay circuit 220A and the second delay circuit 230A of FIG. 4.

Referring to FIG. 5, the first delay circuit 220A may have the first delay amount tD1 that decreases as the magnitude of the common bias C_BIAS increases by a voltage variation amount ΔV, and the second delay circuit 230A may have the second delay amount tD2 that increases as the magnitude of the common bias C_BIAS increases by the voltage variation amount ΔV. Accordingly, as the magnitude of the common bias C_BIAS increases, the first delay control signal D_DEC may have a pulse width that decreases compared to a pulse width PW of the source signal S_SRC, and the second delay control signal D_INC may have a pulse width that increases compared to the pulse width PW of the source signal S_SRC. That is, the first delay control signal D_DEC and the second delay control signal D_INC may have pulse widths that complementarily decrease and increase according to the common bias C_BIAS.

In case where the first delay circuit 220A and the second delay circuit 230A are formed of the same number of transistors, if the magnitude of the common bias C_BIAS increases by a first bias level, the first delay control signal D_DEC may have a pulse width that decreases by a first width, and the second delay control signal D_INC may have a pulse width that increases by the first width. In addition, when the magnitude of the common bias C_BIAS increases by a second bias level, the first delay control signal D_DEC may have a pulse width that decreases by a second width, and the second delay control signal D_INC may have a pulse width that increases by the second width.

Figure 6A:
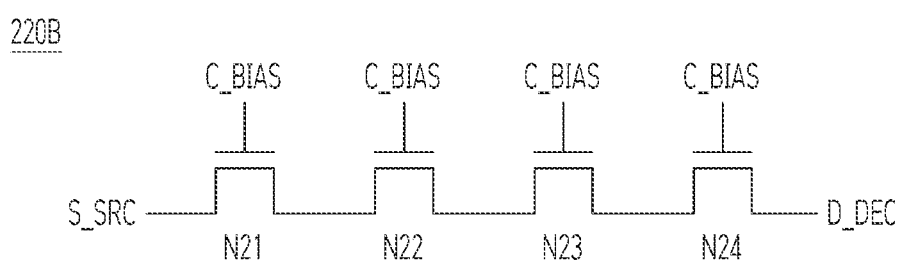
FIGS. 6A and 6B are detailed circuit diagrams illustrating the first delay circuit and the second delay circuit of FIG. 3 according to a second embodiment of the present disclosure.
Figure 6B:
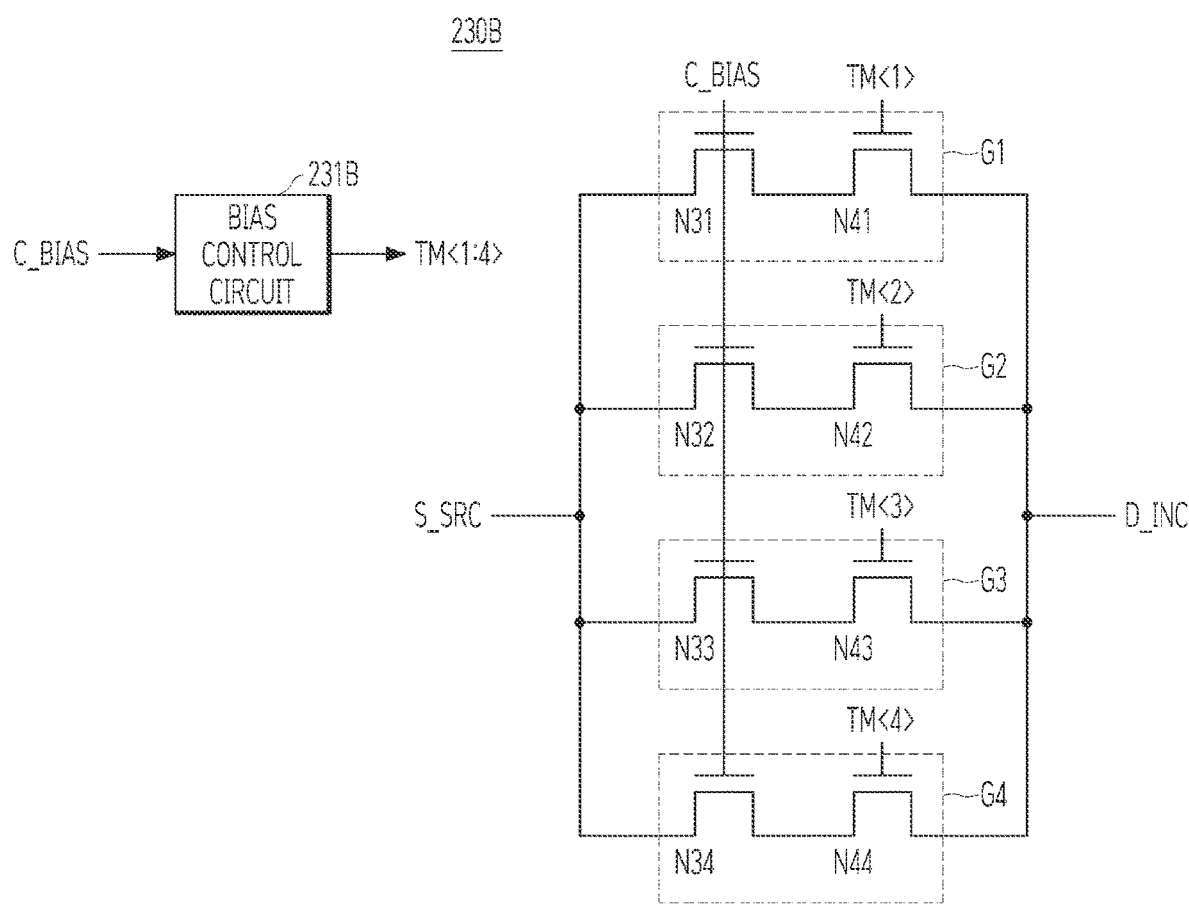

FIGS. 6A and 6B are detailed circuit diagrams illustrating a first delay circuit 220B and a second delay circuit 230B of FIG. 3 according to a second embodiment of the present disclosure. The first delay circuit 220B and the second delay circuit 230B of FIGS. 6A and 6B may correspond to the first delay circuit 220 and the second delay circuit 230 shown in FIG. 3, respectively.

Referring to FIG. 6A, the first delay circuit 220B may include a plurality of NMOS transistors N21 to N24 coupled in series. The plurality of NMOS transistors N21 to N24 may receive the common bias C_BIAS through their gates. The NMOS transistor N21 at a first stage may receive the source signal S_SRC through a drain thereof, and the NMOS transistor N24 at a last stage may output the first delay control signal D_DEC through a source thereof. The first delay circuit 220B of FIG. 6A has substantially the same configuration as the first delay circuit 220A of FIG. 4A. The first delay circuit 220B may have the first delay amount tD1 whose delay amount decreases since the channel resistance decreases as the magnitude of the common bias C_BIAS increases.

Referring to FIG. 6B, the second delay circuit 230B may include a bias control circuit 231B and a plurality of transistor groups G1 to G4. As the magnitude of the common bias C_BIAS increases, the bias control circuit 231B may decrease the number of high bits of selection signals TM<1:4> while increasing the number of low bits of the selection signals TM<1:4>. The plurality of transistor groups G1 to G4 may be coupled in parallel between an input terminal receiving the source signal S_SRC and an output terminal outputting the second delay control signal D_INC. The plurality of transistor groups G1 to G4 may include bias transistors N31 to N34 and selection transistors N41 to N44 respectively coupled in series between the input terminal and the output terminal. The bias transistors N31 to N34 and the selection transistors N41 to N44 may be configured as an NMOS transistor. The bias transistors N31 to N34 may receive the common bias C_BIAS through their gates, and the selection transistors N41 to N44 may receive the selection signals TM<1:4>, respectively, through their gates. Each of the selection transistors N41 to N44 may be turned on according to a corresponding bit of the selection signals TM<1:4>. That is, the second delay circuit 230B may select some groups among the plurality of transistor groups G1 to G4 according to the selection signals TM<1:4>, and may determine the second delay amount tD2 depending on the number of bias transistors N31 to N34 coupled in parallel with each other in the selected transistor groups.

With the above configuration, as the magnitude of the common bias C_BIAS increases, the second delay circuit 230B may decrease the number of high bits of the selection signals TM<1:4>, and accordingly, an equivalent resistance of the plurality of transistor groups G1 to G4 increases. As a result, the second delay circuit 230B may have the second delay amount tD2 whose delay amount increases as the magnitude of the common bias C_BIAS increases.

Figure 7A:
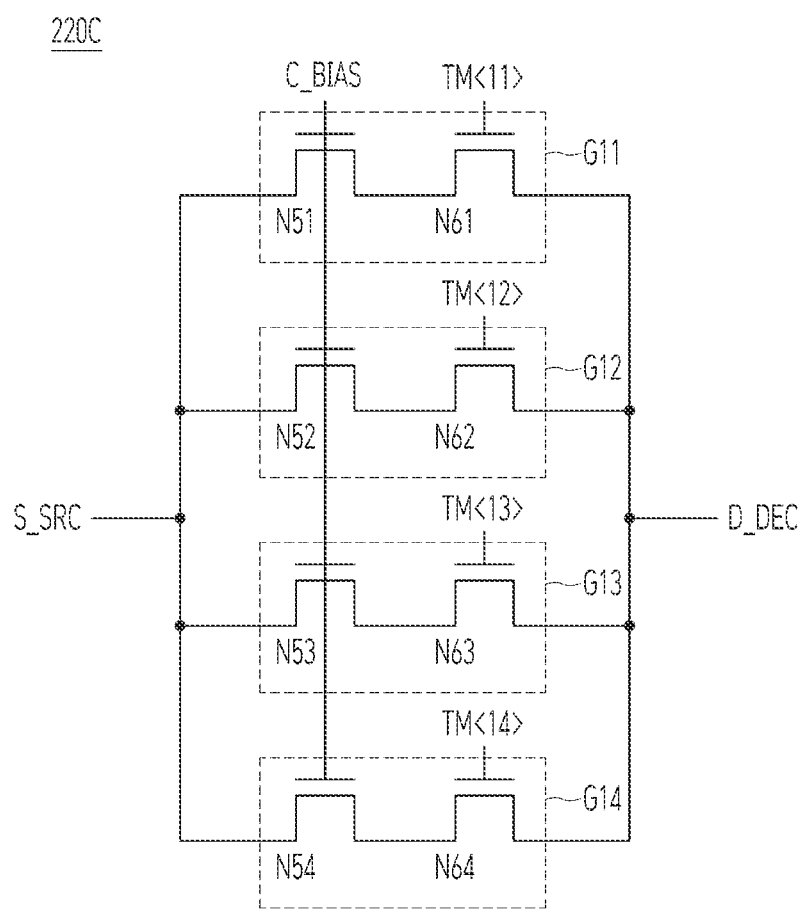
FIGS. 7A and 7B are detailed circuit diagrams illustrating the first delay circuit and the second delay circuit of FIG. 3 according to a third embodiment of the present disclosure.
Figure 7A:
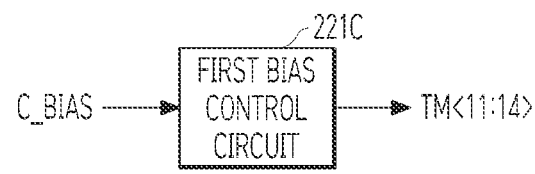
Figure 7B:
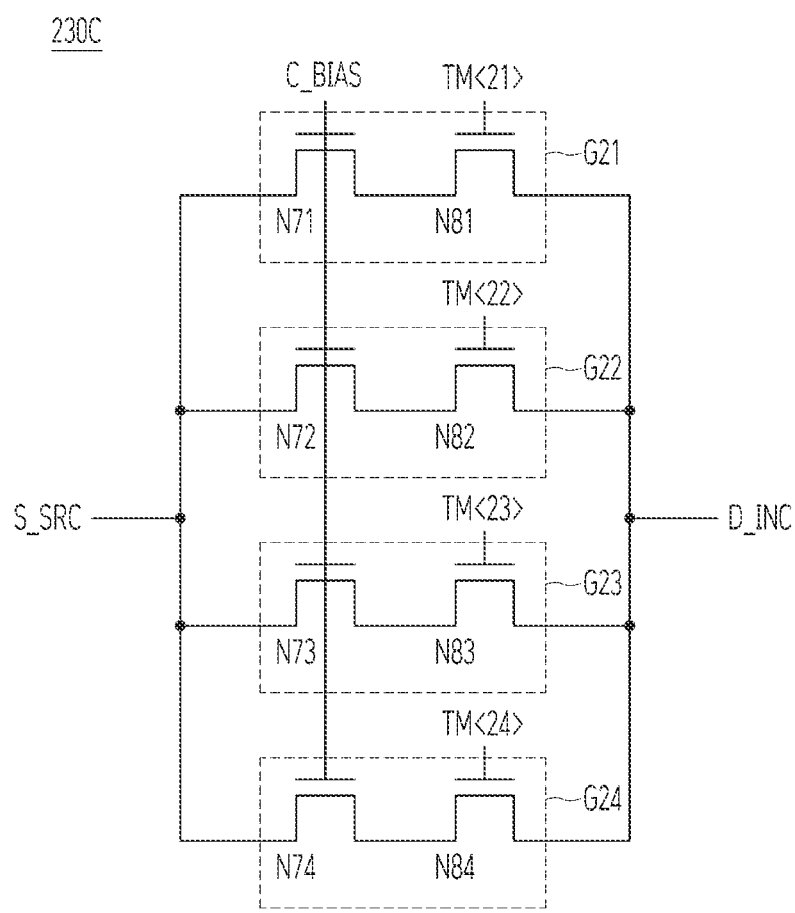
Figure 7B:
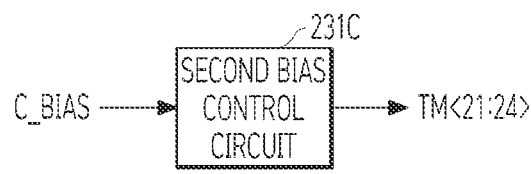

FIGS. 7A and 7B are detailed circuit diagrams illustrating a first delay circuit 220C and a second delay circuit 230C of FIG. 3 according to a third embodiment of the present disclosure. The first delay circuit 220C and the second delay circuit 230C of FIGS. 7A and 7B may correspond to the first delay circuit 220 and the second delay circuit 230 shown in FIG. 3, respectively.

Referring to FIG. 7A, the first delay circuit 220C may include a first bias control circuit 221C and a plurality of first transistor groups G11 to G14. As the magnitude of the common bias C_BIAS increases, the first bias control circuit 221C may decrease the number of high bits of first selection signals TM<11:14> while increasing the number of low bits of the first selection signals TM<11:14>. The plurality of first transistor groups G11 to G14 may be coupled in parallel between an input terminal receiving the source signal S_SRC and an output terminal outputting the first delay control signal D_DEC. The plurality of first transistor groups G11 to G14 may include first bias transistors N51 to N54 and first selection transistors N61 to N64 respectively coupled in series between the input terminal and the output terminal. The first bias transistors N51 to N54 and the first selection transistors N61 to N64 may be configured as an NMOS transistor. The first bias transistors N51 to N54 may receive the common bias C_BIAS through their gates, and the selection transistors N41 to N44 may receive the first selection signals TM<11:14>, respectively, through their gates. The first delay circuit 220C may select some groups among the plurality of first transistor groups G11 to G14 according to the first selection signals TM<11:14>, and may determine the first delay amount tD1 depending on the number of first bias transistors N51 to N54 coupled in parallel with each other in the selected transistor groups.

Referring to FIG. 7B, the second delay circuit 230C may include a second bias control circuit 231C and a plurality of second transistor groups G21 to G24. As the magnitude of the common bias C_BIAS increases, the second bias control circuit 231C may decrease the number of high bits of second selection signals TM<21:24> while increasing the number of low bits of the second selection signals TM<21:24>. The plurality of second transistor groups G21 to G24 may include second bias transistors N71 to N74 and second selection transistors N81 to N84 respectively coupled in series between an input terminal and an output terminal. The second transistor groups G21 to G24 may have substantially the same configuration as the first transistor groups G11 to G14 of the first delay circuit 220C. Accordingly, the second delay circuit 230C may select some groups of the second transistor groups G21 to G24 according to the second selection signals TM<21:24>, and may determine the second delay amount tD2 depending on the number of second bias transistors N71 to N74 coupled in parallel with each other in the selected transistor groups.

In particular, in an embodiment of the present disclosure, the second bias control circuit 231C may control the number of high bits of the second selection signals TM<21:24> to be less than the number of high bits of the first selection signals TM<11:14> as the common bias C_BIAS increases. Accordingly, as the magnitude of the common bias C_BIAS increases, an equivalent resistance of the second delay circuit 230C increases more than that of the first delay circuit 220C. As a result, the first delay circuit 220C may have the first delay amount tD1 that is relatively reduced as the magnitude of the common bias C_BIAS increases, and the second delay circuit 230C may have the second delay amount tD2 that is relatively increased as the magnitude of the common bias C_BIAS increases.

Figure 8A:
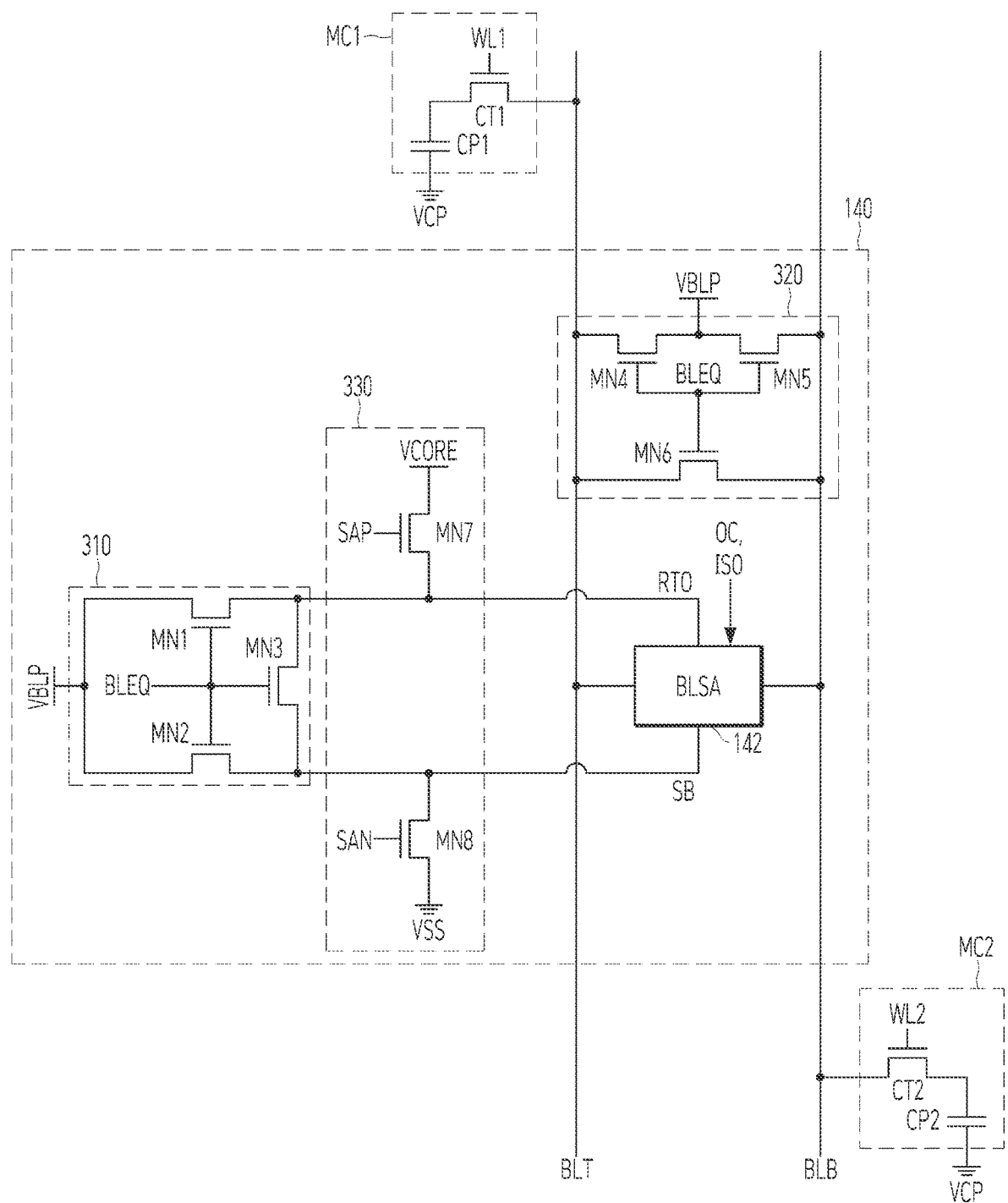
FIGS. 8A and 8B are detailed circuit diagrams illustrating the sense amplifying circuit of FIG. 1.
Figure 8B:
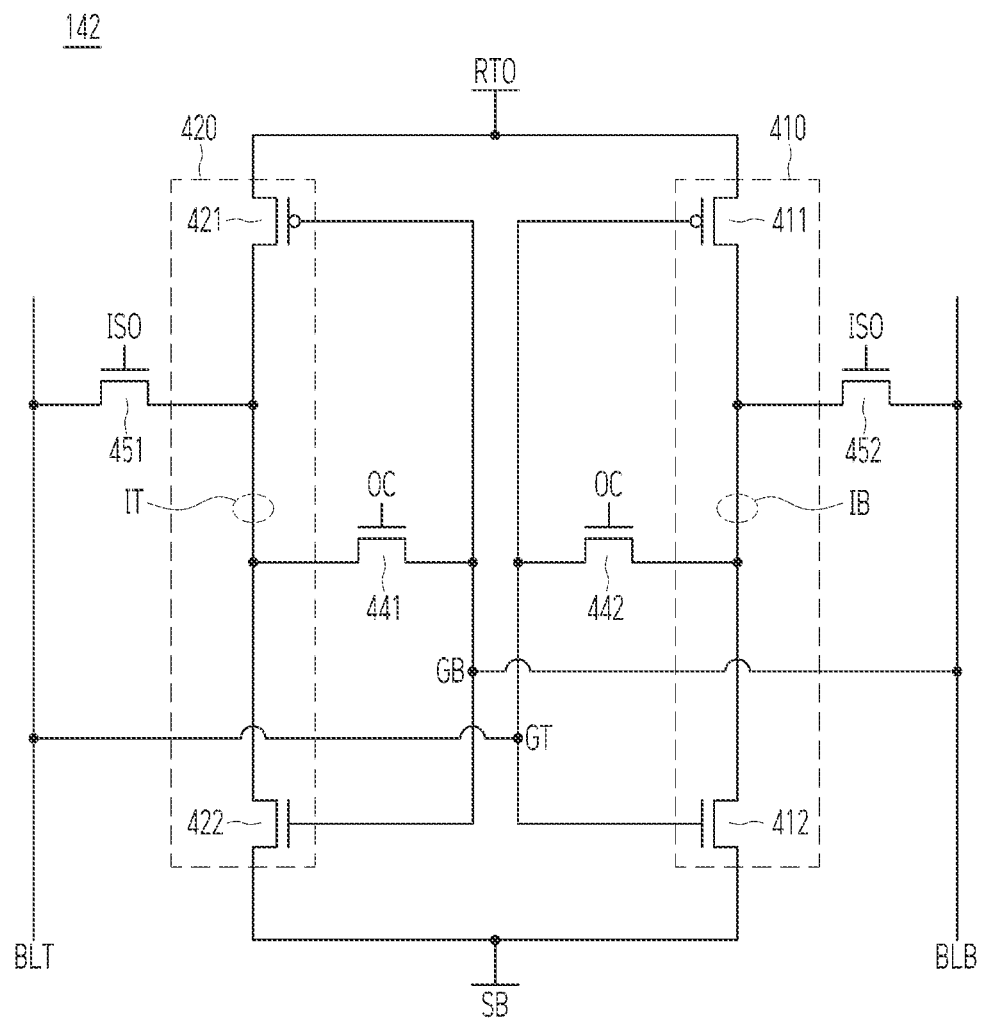

FIGS. 8A and 8B are detailed circuit diagrams illustrating the sense amplifying circuit 140 of FIG. 1.

Referring to FIG. 8A, the sense amplifying circuit 140 for sensing a change in a voltage between a first bit line BLT and a second bit line BLB respectively coupled to a first memory cell MC1 and a second memory cell MC2 included in the memory cell array 110, is shown.

The first memory cell MC1 may be coupled between a first word line WL1 and the first bit line BLT, and include a cell transistor CT1 and a cell capacitor CP1. The cell capacitor CP1 may be coupled between a cell plate voltage (VCP) terminal and the cell transistor CT1. The cell transistor CT1 may be coupled between the cell capacitor CP1 and the first bit line BLT, and have a gate receiving a signal at the first word line WL1. Likewise, the second memory cell MC2 may be coupled between a second word line WL2 and the second bit line BLB, and include a cell transistor CT2 and a cell capacitor CP2. The cell capacitor CP2 may be coupled between the cell plate voltage (VCP) terminal and the cell transistor CT2. The cell transistor CT2 may be coupled between the cell capacitor CP2 and the second bit line BLB, and have a gate receiving a signal at the second word line WL2. For reference, when the first word line WL1 is activated, the first bit line BLT coupled to the cell transistor CT1 to be turned on becomes a target bit line from which an output data is outputted, and the second bit line BLB becomes a reference bit line. Moreover, when the second word line WL2 is activated, the second bit line BLB coupled to the cell transistor CT2 to be turned on becomes a target bit line from which an output data is outputted, and the first bit line BLT becomes a reference bit line.

The sense amplifying circuit 140 may include a first precharge circuit 310, a second precharge circuit 320, a driving circuit 330, and the bit line sense amplifier 142.

The first precharge circuit 310 may supply the precharge voltage VBLP to the pull-up voltage line RTO and the pull-down voltage line SB, in response to the bit line precharge signal BLEQ. The second precharge circuit 320 may supply the precharge voltage VBLP to the first bit line BLT and the second bit line BLB, in response to the bit line precharge signal BLEQ. The precharge voltage VBLP may have an intermediate voltage level between a ground voltage VSS and a core voltage VCORE. The core voltage VCORE may have a voltage level lower than a supply voltage VDD. The first precharge circuit 310 may include first to third NMOS transistors MN1 to MN3, and the second precharge circuit 320 may include fourth to sixth NMOS transistors MN4 to MN6.

The driving circuit 330 may drive the pull-up voltage line RTO and the pull-down voltage line SB by supplying operating voltages to the pull-up voltage line RTO and the pull-down voltage line SB. The driving circuit 330 may include a pull-up driver MN7 and a pull-down driver MN8. The pull-up driver MN7 may provide the core voltage VCORE to the pull-up voltage line RTO in response to the pull-up driving signal SAP. The pull-down driver MN8 may provide the ground voltage VSS to the pull-down voltage line SB in response to the pull-down driving signal SAN. Each of the pull-up driver MN7 and the pull-down driver MN8 may be implemented with an NMOS transistor.

The bit line sense amplifier 142 may be coupled between the pull-up voltage line RTO and the pull-down voltage line SB, and sense and amplify a voltage difference between the first bit line BLT and the second bit line BLB.

Referring to FIG. 8B, the bit line sense amplifier 142 may include a first inverter 410, a second inverter 420, a first offset cancellation switch 441, a second offset cancellation switch 442, a first isolation switch 451, and a second isolation switch 452.

The first inverter 410 may have an input terminal coupled to the first bit line BLT through a first sensing node GT, and an output terminal coupled to a second inner bit line IB. The first inverter 410 may include a PMOS transistor 411 and an NMOS transistor 412 coupled in series between the pull-up voltage line RTO and the pull-down voltage line SB. The second inverter 420 may have an input terminal coupled to the second bit line BLB through a second sensing node GB, and an output terminal coupled to a first inner bit line IT. The second inverter 420 may include a PMOS transistor 421 and an NMOS transistor 422 coupled in series between the pull-up voltage line RTO and the pull-down voltage line SB.

The first offset cancellation switch 441 may electrically couple the first inner bit line IT to the second bit line BLB through the second sensing node GB in response to the offset cancellation signal OC. The second offset cancellation switch 442 may electrically couple the second inner bit line IB to the first bit line BLT through the first sensing node GT in response to the offset cancellation signal OC. Each of the first and second offset cancellation switches 441 and 442 may be implemented with an NMOS transistor.

The first isolation switch 451 may electrically couple the first inner bit line IT to the first bit line BLT in response to the isolation signal ISO. The second isolation switch 452 may electrically couple the second inner bit line IB to the second bit line BLB in response to the isolation signal ISO. Each of the first and second isolation switches 451 and 452 may be implemented with an NMOS transistor.

Hereinafter, an operation of the memory device 100 according to an embodiment will be described with reference to FIGS. 1 to 9.

Figure 9:
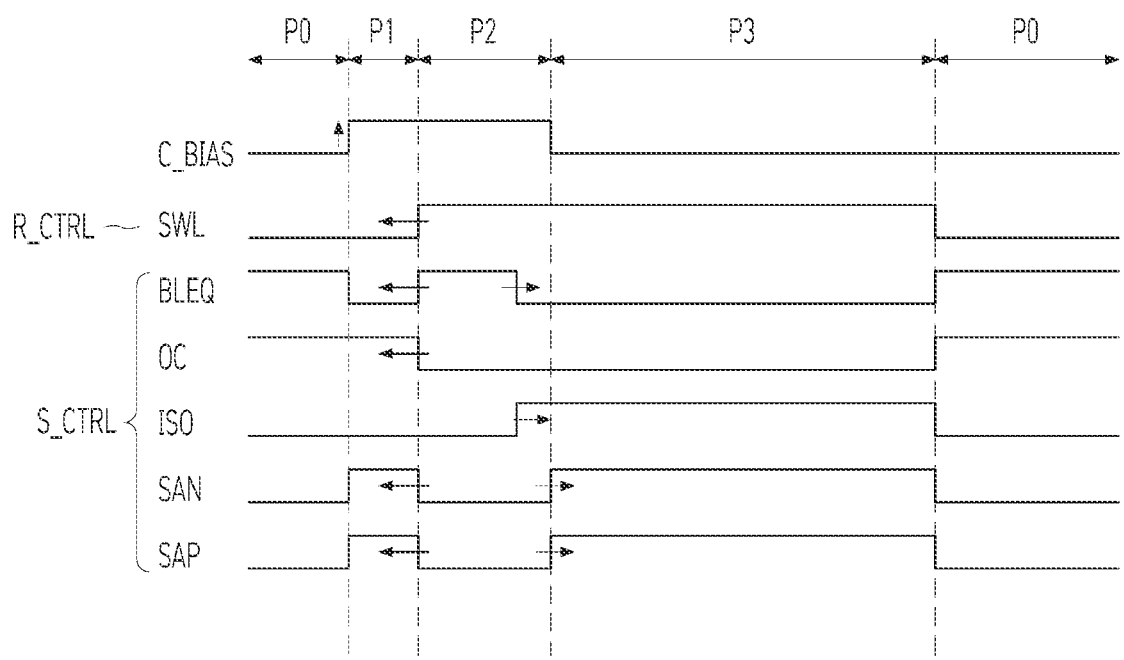
FIG. 9 is a waveform diagram for describing an operation of a memory device in accordance with an embodiment of the present disclosure.

FIG. 9 is a waveform diagram for describing an operation of a memory device in accordance with an embodiment of the present disclosure.

Referring to FIG. 9, the sense amplifying circuit 140 of the memory device 100 may sequentially perform a precharge operation P0, an offset cancellation operation P1, a charge sharing operation P2, and an amplification operation P3.

During the precharge operation P0, the bit line precharge signal BLEQ and the offset cancellation signal OC are activated to a logic high level but the isolation signal ISO is deactivated to a logic low level. In response to the bit line precharge signal BLEQ, the pull-up circuit 310 and the pull-down circuit 320 may apply the precharge voltage VBLP to the pull-up voltage line RTO and the pull-down voltage line SB, and to the first bit line BLT and the second bit line BLB. In response to the offset cancellation signal OC, the first and second offset cancellation switches 441 and 442 are turned on. As a result, during the precharge operation P0, the precharge voltage VBLP may be applied to all of the first inner bit line IT, the second inner bit line IB, the first bit line BLT, the second bit line BLB, the first sensing node GT, and the second sensing node GB so that both the first inverter 410 and the second inverter 420 may be disabled.

During the offset cancellation operation P1, the bit line precharge signal BLEQ becomes deactivated to a logic low level, in a state where the offset cancellation signal OC is activated. At this time, the pull-up driving signal SAP and the pull-down driving signal SAN are activated so that the core voltage VCORE may be supplied to the pull-up voltage line RTO and the ground voltage VSS may be supplied to the pull-down voltage line SB, thereby activating the first inverter 410 and the second inverter 420. Since the first offset cancellation switch 441 and the second offset cancellation switch 442 are turned on, the input terminal of the first inverter 410 is coupled to the output terminal thereof, and the input terminal of the second inverter 420 is coupled to the output terminal thereof. In this case, a mismatch due to a process variation between the PMOS transistors 411 and 421 and the NMOS transistors 412 and 422 in the first inverter 410 and the second inverter 420 may be reflected into the first bit line BLT and the second bit line BLB.

During the charge sharing operation P2, the pull-up driving signal SAP, the pull-down driving signal SAN, and the offset cancellation signal OC are deactivated to a logic low level, and a selected word line WL is activated. The bit line precharge signal BLEQ is activated so that the precharge voltage VBLP may be applied to the pull-up voltage line RTO and the pull-down voltage line SB. While the first bit line BLT and the second bit line BLB are isolated from each other, a charge sharing operation may be performed in which a cell transistor of the memory cell MC connected to the selected word line WL is turned on and a charge stored in the cell capacitor flows into the first bit line BLT. Due to the charge sharing operation, a voltage level of the first bit line BLT may be slightly higher or lower than a voltage level of the second bit line BLB.

Prior to the amplification operation P3, the bit line precharge signal BLEQ becomes deactivated and, at the same time, the isolation signal ISO is activated.

During the amplification operation P3, the pull-up driving signal SAP and the pull-down driving signal SAN are activated, and thus a pull-up voltage at a level of the core voltage VCORE and a pull-down voltage at a level of the ground voltage VSS are supplied to the pull-up voltage line RTO and the pull-down voltage line SB, respectively, and thus the first inverter 410 and the second inverter 420 are activated. The first isolation switch 451 and the second isolation switch 452 are turned on, so that the first bit line BLT and the first inner bit line IT may be coupled, and the second bit line BLB and the second inner bit line IB may be coupled. Accordingly, a voltage difference between the first bit line BLT and the second bit line BLB may be amplified. Since the amplification operation starts in the state in which the offset is reflected, the bit line sense amplifier 142 may perform the amplification operation relatively accurately. That is, an offset voltage may be reduced, thereby ensuring an accurate operation of the bit line sense amplifier 142.

In an embodiment of the present disclosure, the common bias C_BIAS may increase by a predetermined level during the offset cancellation operation P1 and the charge sharing operation P2. Accordingly, as described in FIG. 5, the first delay circuit 220 may generate the first delay control signal D_DEC according to the first delay amount tD1 that decreases according to the common bias C_BIAS, and the second delay circuit 230 may generate the second delay control signal D_INC according to the second delay amount tD2 that increases according to the common bias C_BIAS.

The first transition control circuit 241 may generate the word line driving signal SWL whose rising edge is advanced and the offset cancellation signal OC whose falling edge is advanced, according to the first delay control signal D_DEC. The second transition control circuit 242 may generate the bit line precharge signal BLEQ whose rising edge is advanced according to the first delay control signal D_DEC, and whose falling edge is delayed according to the second delay control signal D_INC. In addition, the second transition control circuit 242 may generate the pull-up driving signal SAP and the pull-down driving signal SAN each of which has a falling edge that is advanced according to the first delay control signal D_DEC and a rising edge that is delayed according to the second delay control signal D_INC. The third transition control circuit 243 may generate the isolation signal ISO whose rising edge is delayed according to the second delay control signal D_INC.

In the prior art, since the delay circuits for controlling the offset cancellation operation P1 and the charge sharing operation P2 operate independently, the offset cancellation operation P1 is finished earlier than a scheduled offset cancellation period tMC, the charge sharing operation P2 was performed only for a scheduled charge sharing period tCS, making it difficult to improve overall performance. However, in an embodiment of the present disclosure, the row control signal R_CTRL and the sensing control signal S_CTRL may be generated using delay circuits that complementarily operate based on a common bias. Accordingly, if the offset cancellation operation P1 is finished earlier than the scheduled offset cancellation period tMC, the charge sharing operation P2 may be performed for a complementary longer period than the scheduled charge sharing period tCS. Therefore, in an embodiment of the present disclosure, the offset cancellation operation P1 and the charge sharing operation P2 to be performed within the RAS-to-CAS delay time tRCD may be performed in conjunction with each other, thereby maximizing the operation efficiency while minimizing the area occupied by the delay circuits.

In the above embodiment, the offset cancellation operation P1 and the charge sharing operation P2 are performed in conjunction with each other within the RAS-to-CAS delay time tRCD, but the embodiment is not limited thereto. The embodiment may be applicable to a configuration that performs internal operations in conjunction with each other to be performed within a target time.

Figure 10:
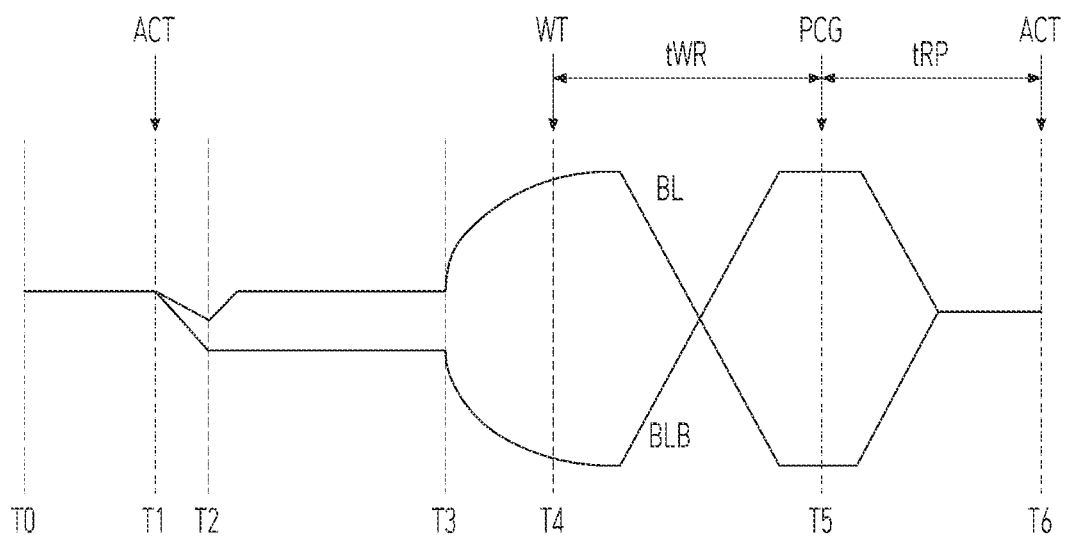
FIG. 10 is a waveform diagram for describing an operation of the sense amplifying circuit of FIG. 1.

FIG. 10 is a waveform diagram for describing an operation of the sense amplifying circuit 140 of FIG. 1. In FIG. 2, a write operation of a bit line sense amplifier 142 is illustrated.

Referring to FIG. 10, during a section from T0 to T1 before the active command ACT is input, the bit line sense amplifier 142 may perform a precharge operation of driving a pair of bit lines BLT and BLB to a precharge voltage VBLP. When the active command ACT is input at T1, an offset cancellation operation during a section from T1 to T2 and a charge sharing operation during a section from T2 to T3 may be sequentially performed.

During a section from T3 to T4 before the write command WT is input, the bit line sense amplifier 142 may perform a pre-sensing operation to secure a sensing margin of a main sensing operation subsequently performed. When the write command WT is input at T4, during a section from T4 to T5, the bit line sense amplifier 142 may sense and amplify a voltage difference between the first bit line BLT and the second bit line BLB by performing the main sensing operation. In FIG. 10, a case in which a low data is written while a high data is already stored in a memory cell is illustrated. The main sensing operation may be defined as a write operation.

When the precharge command PCG is input at T5, the bit line sense amplifier 142 may perform a precharge operation of driving a pair of bit lines BLT and BLB to a precharge voltage VBLP.

When the active command ACT is input at T6, the above operations including the precharge operation, the offset cancellation operation, the charge sharing operation, and the write operation, may be performed again.

At this time, a section from the application of the write command WT to the application of the precharge command PCG (i.e., a section from T4 to T5 of FIG. 10) may be defined as a write recovery time tWR, and a section from the application of the precharge command PCG to the application of the active command ACT (i.e., a section from T5 to T6 of FIG. 10) may be defined as a row precharge time tRP. Hereinafter, in an embodiment of the present disclosure, a method of complementarily controlling the write recovery time tWR and the row precharge time tRP using complementary delay circuits will be described.

Figure 11:
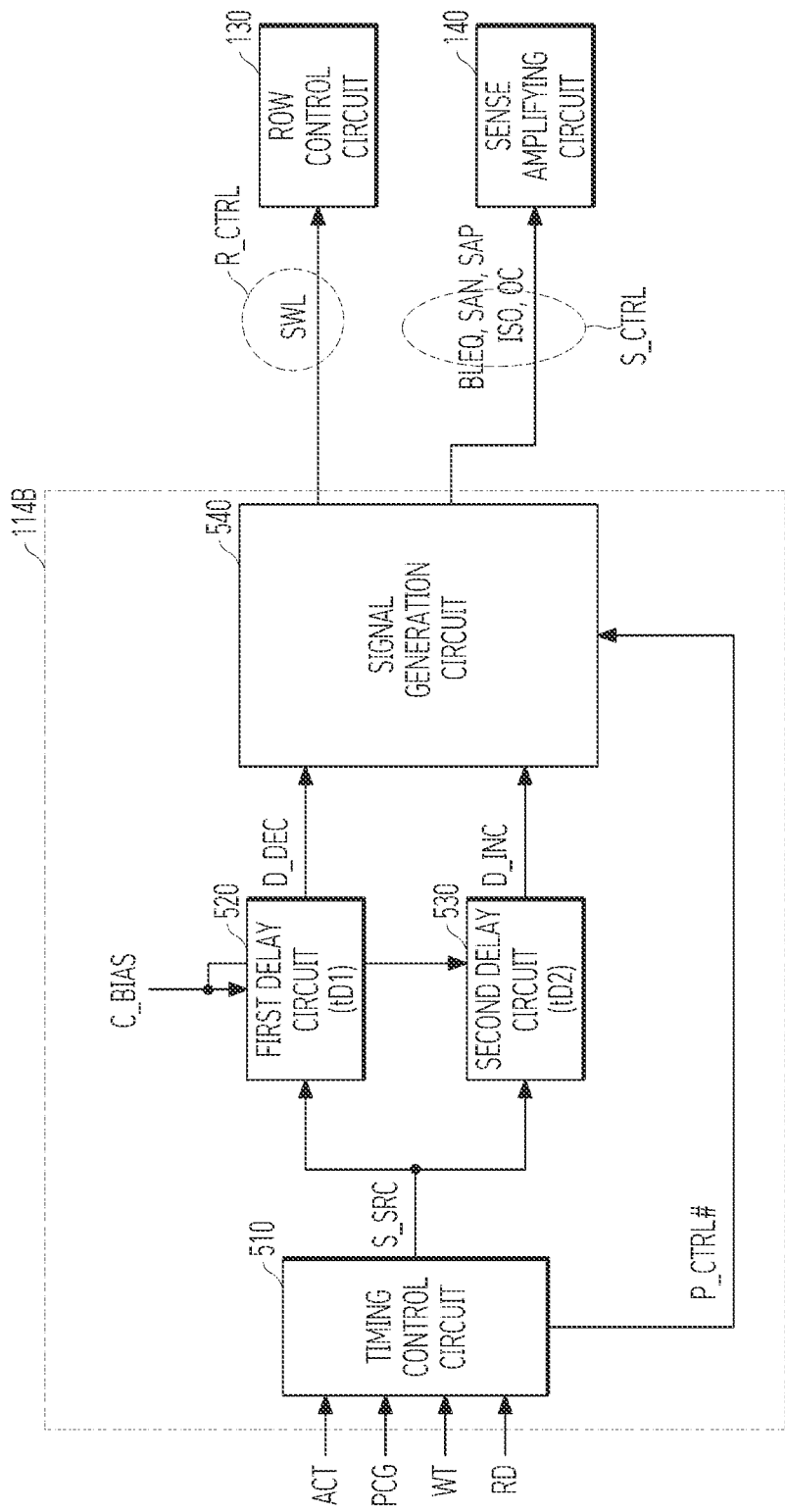
FIG. 11 is a detailed block diagram illustrating the control logic of FIG. 1 in accordance with another embodiment of the present disclosure.

FIG. 11 is a detailed block diagram illustrating a control logic 114B of FIG. 1 in accordance with another embodiment of the present disclosure. The control logic 114B of FIG. 11 may correspond to the control logic 114 shown in FIG. 1.

Referring to FIG. 11, the control logic 114B may include a timing control circuit 510, a first delay circuit 520, a second delay circuit 530, and a signal generation circuit 540.

The timing control circuit 510, the first delay circuit 520, and the second delay circuit 530 of FIG. 11 may be substantially the same as the configurations of FIG. 3. The first delay circuit 520 may have a first delay amount tD1 that decreases according to a common bias C_BIAS, and may generate a first delay control signal D_DEC by adjusting a pulse width of a source signal S_SRC according to the first delay amount tD1. The second delay circuit 530 may have a second delay amount tD2 that increases according to the common bias C_BIAS, and may generate a second delay control signal D_INC by adjusting the pulse width of the source signal S_SRC according to the second delay amount tD2. The detailed configurations and operations of the first delay circuit 520 and the second delay circuit 530 may correspond to the configurations and operations described in FIGS. 4A to 7B.

The signal generation circuit 540 may generate a plurality of internal control signals according to the first delay control signal D_DEC and the second delay control signal D_INC. The signal generation circuit 540 may generate the plurality of internal control signals corresponding to a plurality of timing control signals P_CTRL #. The signal generation circuit 540 may generate the plurality of internal control signals by adjusting one of falling and rising edges of the plurality of timing control signals P_CTRL # according to the first delay control signal D_DEC, while adjusting the other one of the falling and rising edges of the plurality of timing control signals P_CTRL # according to the second delay control signal D_INC. In an embodiment of the present disclosure, the internal control signals may include the row control signal R_CTRL and the sensing control signal S_CTRL. The row control signal R_CTRL includes a word line driving signal SWL for driving a word line selected from among the plurality of word lines, and the sensing control signal S_CTRL includes a bit line precharge signal BLEQ, a pull-up driving signal SAP, a pull-down driving signal SAN, an offset cancellation signal OC, and an isolation signal ISO.

Hereinafter, an operation of the memory device 100 according to another embodiment will be described with reference to FIGS. 10 to 12.

Figure 12:
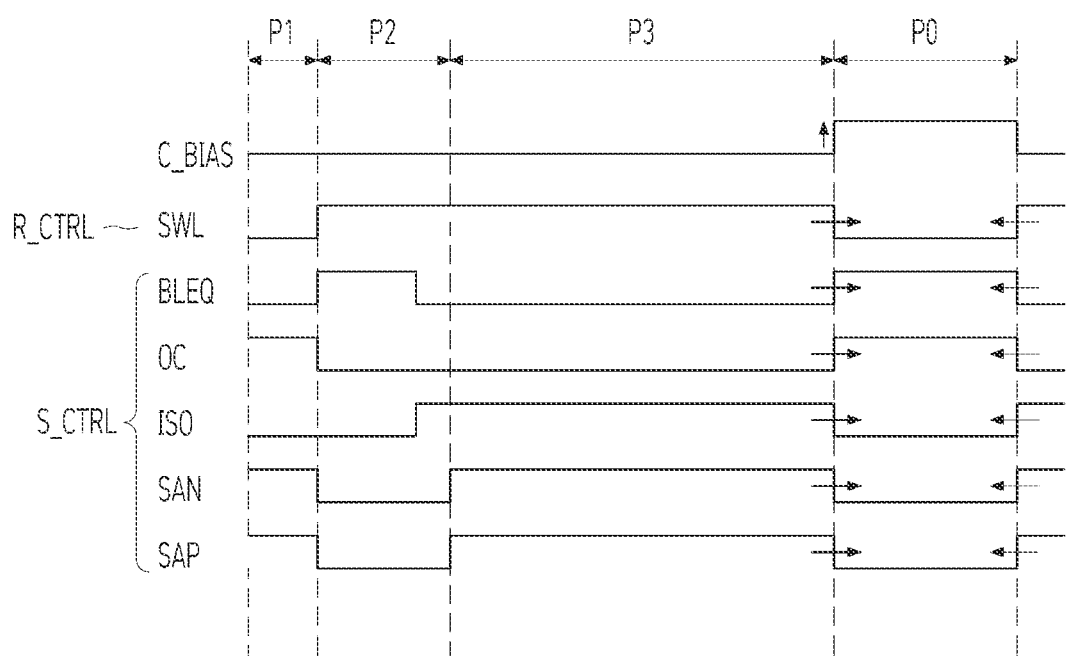
FIG. 12 is a waveform diagram for describing an operation of a memory device in accordance with another embodiment of the present disclosure.

FIG. 12 is a waveform diagram for describing an operation of a memory device in accordance with another embodiment of the present disclosure.

Referring to FIG. 12, the sense amplifying circuit 140 of the memory device 100 may sequentially perform a precharge operation P0, an offset cancellation operation P1, a charge sharing operation P2, and an amplification operation P3. The precharge operation P0, the offset cancellation operation P1, the charge sharing operation P2, and the amplification operation P3 of FIG. 12 may be substantially the same as the operations of FIG. 9.

In an embodiment of the present disclosure, the common bias C_BIAS may increase by a predetermined level during the precharge operation P0. Accordingly, the first delay circuit 520 may generate the first delay control signal D_DEC according to the first delay amount tD1 that decreases according to the common bias C_BIAS, and the second delay circuit 530 may generate the second delay control signal D_INC according to the second delay amount tD2 that increases according to the common bias C_BIAS.

The signal generation circuit 540 may generate the word line driving signal SWL, the isolation signal ISO, the pull-up driving signal SAP, and the pull-down driving signal SAN in which rising edges are advanced according to the first delay control signal D_DEC, and falling edges are delayed according to the second delay control signal D_INC. In addition, the signal generation circuit 540 may generate the bit line precharge signal BLEQ and the offset cancellation signal OC in which rising edges are delayed according to the second delay control signal D_INC, and falling edges are advanced according to the first delay control signal D_DEC.

As described above, in another embodiment of the present disclosure, the row control signal R_CTRL and the sensing control signal S_CTRL may be generated using delay circuits that complementarily operate based on a common bias. Accordingly, the precharge operation P0 and the sensing operation P3 may be performed in conjunction with each other for the write recovery time tWR and the row precharge time tRP, thereby maximizing the operation efficiency while minimizing the area occupied by the delay circuits.

It should be noted that although the technical spirit of the disclosure has been described in connection with embodiments thereof, this is merely for description purposes and should not be interpreted as limiting. It should be appreciated by one of ordinary skill in the art that various changes may be made thereto without departing from the technical spirit of the disclosure.

For example, for the logic gates and transistors provided as examples in the above-described embodiments, different positions and types may be implemented depending on the polarity of the input signal. Furthermore, the embodiments may be combined to form additional embodiments.

From the foregoing it will be appreciated that, although specific embodiments of the invention have been described herein for purposes of illustration, various modifications may be made without deviating from the spirit and scope of the invention. Accordingly, the invention should not be limited except according to the following appended claims.

What is claimed is:

1. A semiconductor device comprising:
   a first delay circuit having a first delay amount that decreases according to a common bias, and configured to generate a first delay control signal based on the first delay amount, wherein the first delay circuit includes a plurality of first transistors coupled between a first input terminal receiving a source signal and a first output terminal outputting the first delay control signal, each of the plurality of first transistors having a gate receiving the common bias;
   a second delay circuit having a second delay amount that increases according to the common bias, and configured to generate a second delay control signal based on the second delay amount, wherein the second delay circuit includes a plurality of second transistors coupled between a second input terminal receiving the source signal and a second output terminal outputting the second delay control signal, each of the plurality of second transistors having a gate receiving the common bias;
   a signal generation circuit configured to generate a plurality of internal control signals in response to at least one of the first delay control signal and the second delay control signal; and
   an internal operation circuit configured to complementarily perform a first operation and a second operation within a target time in response to the internal control signals.

2. The semiconductor device of claim 1,
   wherein the first delay circuit is configured to adjust a pulse width of the source signal according to the first delay amount to generate the first delay control signal, and
   wherein the second delay circuit is configured to adjust the pulse width of the source signal according to the second delay amount to generate the second delay control signal.

3. The semiconductor device of claim 1,
wherein the plurality of first transistors include a plurality of first type transistors coupled in series between the first input terminal and the first output terminal, and
wherein the plurality of second transistors include a plurality of second type transistors coupled in series between the second input terminal and the second output terminal.

4. The semiconductor device of claim 3,
wherein each of the plurality of first type transistors has a channel resistance that decreases as a gate voltage increases, and
wherein each of the plurality of second type transistors has a channel resistance that increases as a gate voltage increases.

5. The semiconductor device of claim 1,
wherein the plurality of first transistors include a plurality of first type transistors coupled in series between the first input terminal and the first output terminal, and
wherein the plurality of second transistors include a plurality of transistor groups to be selectively coupled in parallel between the second input terminal and the second output terminal, wherein a number of transistor groups coupled in parallel decreases as the common bias increases.

6. The semiconductor device of claim 5,
wherein the second delay circuit further includes a bias control circuit configured to decrease a number of high bits of selection signals while increasing a number of low bits of the selection signals, as the common bias increases, and
wherein each of the plurality of transistor groups includes a selection transistor and a bias transistor coupled in series, the selection transistor having a gate receiving a corresponding bit of the selection signals, and the bias transistor having a gate receiving the common bias.

7. The semiconductor device of claim 5,
wherein each of the plurality of first type transistors has a channel resistance that decreases as a gate voltage increases, and
wherein each of the plurality of transistor groups has an equivalent resistance that increases as the common bias increases.

8. The semiconductor device of claim 1,
wherein the plurality of first transistors include a plurality of first transistor groups coupled in parallel between the first input terminal and the first output terminal,
wherein the plurality of second transistors include a plurality of second transistor groups coupled in parallel between the second input terminal and the second output terminal, and
wherein, as the common bias increases, a number of second transistor groups coupled in parallel is controlled to be less than a number of first transistor groups coupled in parallel.

9. The semiconductor device of claim 8,
wherein the first delay circuit further includes a first bias control circuit configured to decrease a number of high bits of first selection signals while increasing a number of low bits of the first selection signals, as the common bias increases, and
wherein each of the plurality of first transistor groups includes a first selection transistor and a first bias transistor coupled in series, the first selection transistor having a gate receiving a corresponding bit of the first selection signals, and the first bias transistor having a gate receiving the common bias.

10. The semiconductor device of claim 9,
wherein the second delay circuit further includes a second bias control circuit configured to decrease a number of high bits of second selection signals while increasing a number of low bits of the second selection signals, as the common bias increases, wherein the second bias control circuit controls the number of high bits of the second selection signals to be less than the number of high bits of the first selection signals, and
wherein each of the plurality of second transistor groups includes a second selection transistor and a second bias transistor coupled in series, the second selection transistor having a gate receiving a corresponding bit of the second selection signals, and the second bias transistor having a gate receiving the common bias.

11. The semiconductor device of claim 1,
wherein the internal operation circuit is configured to sequentially perform the first operation and the second operation within the target time, and
wherein the internal operation circuit is configured to increase an execution time for the second operation while decreasing an execution time for the first operation, as the common bias increases.

12. A memory device comprising:
a memory cell array;
a control logic configured to include a first delay circuit to generate a first delay control signal based on a first delay amount that decreases according to a common bias, and a second delay circuit to generate a second delay control signal based on a second delay amount that increases according to the common bias, and the control logic configured to generate a plurality of internal control signals corresponding to a command according to the first delay control signal and the second delay control signal, wherein the plurality of first transistors coupled between a first input terminal receiving a source signal and a first output terminal outputting the first delay control signal, each of the plurality of first transistors having a gate receiving the common bias, and the second delay circuit includes a plurality of second transistors coupled between a second input terminal receiving the source signal and a second output terminal outputting the second delay control signal, each of the plurality of second transistors having a gate receiving the common bias;
a row control circuit coupled to the memory cell array through a plurality of word lines, and configured to drive the word lines in response to the internal control signals; and
a sense amplifying circuit coupled to the memory cell array through a plurality of bit lines, and configured to sense and amplify data of the bit lines in response to the internal control signals.

13. The memory device of claim 12, wherein the control logic includes:
a timing control circuit configured to generate the source signal and a plurality of timing control signals according to the command;
the first delay circuit having the first delay amount, and configured to generate the first delay control signal by adjusting a pulse width of the source signal according to the first delay amount;
the second delay circuit having the second delay amount, and configured to generate the second delay control signal by adjusting the pulse width of the source signal according to the second delay amount; and a signal generation circuit configured to generate the internal control signals corresponding to the plurality of timing control signals according to the first delay control signal and the second delay control signal.

14. The memory device of claim 13,
wherein the plurality of first transistors include a plurality of first type transistors coupled in series between the first input terminal and the first output terminal, and
wherein the plurality of second transistors include a plurality of transistor groups coupled in parallel between the second input terminal and the second output terminal,
wherein the number of transistor groups coupled in parallel decreases as the common bias increases.

15. The memory device of claim 14,
wherein each of the plurality of first type transistors has a channel resistance that decreases as a gate voltage increases, and
wherein each of the plurality of transistor groups has an equivalent resistance that increases as the common bias increases.

16. The memory device of claim 13,
wherein the plurality of first transistors include a plurality of first transistor groups coupled in parallel between the first input terminal and the first output terminal,
wherein the plurality of second transistors include a plurality of second transistor groups coupled in parallel between the second input terminal and the second output terminal, and
wherein a number of second transistor groups coupled in parallel is controlled to be less than a number of first transistor groups coupled in parallel.

17. The memory device of claim 12,
wherein the plurality of first transistors include a plurality of first type transistors coupled in series between the first input terminal and the first output terminal, and
wherein the plurality of second transistors include a plurality of second type transistors coupled in series between the second input terminal and the second output terminal.

18. The memory device of claim 17,
wherein each of the plurality of first type transistors has a channel resistance that decreases as a gate voltage increases, and
wherein each of the plurality of second type transistors has a channel resistance that increases as a gate voltage increases.

19. The memory device of claim 12,
wherein the sense amplifying circuit sequentially performs an offset cancellation operation for removing an offset of a bit line pair and a charge sharing operation for sharing a charge of a memory cell with one of the bit line pair, within a RAS-to-CAS delay time,
wherein the sense amplifying circuit increases an execution time for the charge sharing operation while decreasing an execution time for the offset cancellation operation, as the common bias increases.

20. The memory device of claim 12,
wherein the sense amplifying circuit sequentially performs a main sensing operation for sensing and amplifying a data of a bit line pair and a precharge operation for applying a precharge voltage to the bit line pair, within a write recovery time and a row precharge time,
wherein the sense amplifying circuit increases an execution time for the main sensing operation while decreasing an execution time for the precharge operation, as the common bias increases.

* * * * *